3,017,376
CROSSLINKING PROCESS
Richard A. Bafford, Baltimore, and Razmic S. Gregorian, Silver Spring, Md., assignors to W. R. Grace & Co., Clarksville, Md., a corporation of Connecticut
No Drawing. Filed Dec. 1, 1959, Ser. No. 856,377
11 Claims. (Cl. 260—23)

This invention relates to synthetic polymeric materials and more particularly to a process for curing polymers or olefin copolymers containing ethylene.

The prior art teaches various methods of crosslinking polyethylene to convert it to relatively insoluble, less thermoplastic polymer. One method involves electron bombardment of the polymer at temperatures below the melting point. See U.S. Patent 2,906,678. Other methods are based primarily on incorporating a free radical liberating substance into the solid polymers followed by or concurrent with heating. Many free radical-liberating substances have been employed for this purpose including especially organic peroxides. See U.S. 2,826,570.

While it is well known that such organic peroxides when incorporated in an ethylene polymer can promote crosslinking thereof, the use of such peroxides entails several disadvantages. For example, at the incorporation temperature certain peroxides (e.g. benzoyl peroxide) decompose violently. Other peroxides at the incorporation temperature possess a half life too short to become thoroughly admixed in the polymer before crosslinking occurs. This results in a non-homogeneous crosslinking as can be seen in film clarity tests.

It is an object of the instant invention to provide a novel crosslinking promoter for polyethylene.

A further object of the present invention is to provide a crosslinking promoter, which at the temperature of incorporation into the polymer, generates radicals at such a rate that the blending period is of sufficient duration to provide homogeneous crosslinking. Still another object of the instant invention is to provide a crosslinked polyethylene having good clarity. These and other objects will become apparent from reading hereinafter. Surprisingly, we have now found a process of crosslinking a member of the group consisting of polyethylene and a copolymer of ethylene and butylene which comprises subjecting in the presence of free oxygen (e.g. air) said member at a temperature above its melting point to the action of certain transition metal compounds which are soluble in one of said polymer group members. The transition metals operable in the instant invention are members of the group consisting of manganese and cobalt.

Any compound containing Mn or Co which is soluble in polyethylene or a copolymer of ethylene and butylene is operable as a crosslinking promoter.

The term, "compound containing Mn or Co which is soluble in polyethylene or a copolymer of ethylene and butylene," includes such groups as salts of organic acids, metal complexes, and alkoxides. Such salts would include but are not limited to butyrates, octoates, stearates, naphthenates, resinates, tallates, linoresinates, etc. Examples of metal complexes containing Mn or Co which are operable include but are not limited to acetylacetonates, dimethylglyoximes, and benzoin oximes. Obviously, within the groups supra compounds containing greater organic portions therein have greater solubility.

The amount of crosslinking promoter used in the present invention is dependent upon the specific crosslinking agent employed. However, the transition metal from the group consisting of Co and Mn should be present in the soluble crosslinking promoter in an amount in the range 0.002–0.026% based on the weight of the total reactants charged. Amounts of transition metal from the group consisting of Co and Mn less than prescribed in the aforesaid range are operable but the time interval prior to crosslinking becomes so long that undesirable side effects such as polymer degradation are introduced. On the other hand excess amounts of Co or Mn in excess of the range are also undesirable as oxidative degradation becomes faster than the crosslinking reaction.

The temperature within which the crosslinking promoter will operate in accordance with this invention has wide limits. A temperature range between the melting point of the ethylene polymer or copolymer and 200° C. is operable. Even higher temperatures may be employed if heat degradation does not ensue. A preferred range for ethylene polymers is 150–180° C.

Since most, if not all commercial grade polyethylene contains an antioxidant, usually in the form of an aromatic amine or a hindered phenol, which preferentially reacts with any free radicals formed, the crosslinking reaction is preceded by an induction period. This induction period can if desired be reduced or totally eliminated by the addition of trace amounts of additives e.g. peroxides or hydroperoxides which decompose at the operating temperature to produce free radicals which will accelerate the consumption of the antioxidant.

The polyethylene operable as a reactant in the instant invention includes all solid polyethylene known to date. Thus high density polyethylene (density 0.95–0.97) as claimed in U.S. 2,816,883 operates equally as well as the conventional low density polyethylene claimed in U.S. 2,153,553.

The following examples are set forth to illustrate but not limit this invention. In all examples a Brabender Plastograph Model PL–V2 equipped with a recording unit for measuring changes in torque was used to admix the reactants and determine the amount of crosslinking. The aforesaid recording unit had a range of 0–1000 units equal to 0–1 kilogram-meter of torque. The degree of crosslinking is related to the increase in torque ($\Delta\tau$) measured by the Plastograph recorder from the time the crosslinking promoter is added to the molten polymer until the crosslinking reaction is discontinued. The greater the degree of crosslinking the greater the viscosity of the polyethylene which in turn requires a greater torque in order to drive the Plastograph at a constant r.p.m. The degree of crosslinking which can be accomplished by the instant invention is limited only by the ability of the mixing apparatus to overcome the torque caused by the crosslinking. Thus, polyethylene can be wholly crosslinked if desired with proper equipment available.

The melt indices in all examples were measured under the conditions specified in ASTMD 1238–52T.

EXAMPLE 1

40.0 g. commercial polyethylene in granule form having a melt index of 6.7 and a density of 0.960 were charged over a 3 minute period to a Brabender Plastograph mixing head open to the atmosphere and maintined at a temperature of 175° C. After mixing for 15 minutes, the recorder plotted a constant torque indicating the polyethylene was molten. Manganese stearate in an amount equal to 0.05% of the total charge to the Plastograph was then added while mixing. Mixing was continued for 12½ minutes at which time the crosslinking reaction was discontinued by adding an antioxidant 0.05 g. Ionol (2,6-ditertiary-butyl-4-methyl-phenol). The increase in torque ($\Delta\tau$) from the time the manganese stearate was added to the time the antioxidant was added was equal to 500 units as measured by the recorder. The thus crosslinked product had a melt index of 0.70 pressed, and exhibited remarkable clarity.

EXAMPLE 2

Using the apparatus and procedure of Example 1, 38 g. of granulated commercial polyethylene having a melt index of 0.7 were charged to the Plastograph mixing head open to the atmosphere and maintained at a temperature of 175° C. After 15 minutes a reduced constant torque was recorded and 0.02 g. cobalt stearate was added to the polyethylene in the mixing head. After 4 minutes crosslinking was discontinued by the addition of 0.05 g. 8-hydroxyquinoline. An increase in torque ($\Delta\tau$) of 160 units was recorded. The thus-crosslinked polyethylene product on characterization had a melt index of 0.17 unpressed.

EXAMPLE 3

The procedure of Example 2 was followed except that 0.06 g. cobalt acetylacetonate was added in place of cobalt stearate. An increase in torque ($\Delta\tau$) of 250 units was recorded 3 minutes after the addition of the crosslinking promoter to the molten polymer. It should be understood that it is not necessary to wait until the polymer is molten to add the crosslinking promoter. The reactants can be preblended prior to heating if desired. The instant invention is also operable in crosslinking blends of polyethylene as can be seen in the following example.

EXAMPLE 4

34.2 g. commercial polyethylene (density 0.960) having a melt index of 0.7 and 3.8 g. commercial polyethylene (density 0.92) having a melt index of 1.95 were charged in granule form to a Brabender Plastograph mixing head open to the atmosphere and maintained at 175° C. as in Example 1. After the charge became molten as shown by a constant reading on the torque recorder, 0.001 g. cumene hydroperoxide was added to react with the antioxidant present in the commercial polyethylene followed immediately by the addition of manganese stearate in an amount equal to 0.05% of the total charge. The crosslinking reaction was stopped in three minutes by the addition of Ionol. The increase in torque ($\Delta\tau$) was 220 units. The crosslinked polymer product had a melt index of 0.12 pressed and exhibited very good clarity.

The operability of the instant invention in crosslinking polyethylene copolymers is evidenced by the following example.

EXAMPLE 5

40 g. of a copolymer (melt index=0.46) consisting essentially of 98% ethylene and 2% butylene molecules were charged to a Brabender Plastograph as in Example 1. After the recorder plotted a reduced torque for a constant period, indicating the copolymer was molten, 0.02 g. manganese stearate was added thereto. Within four and a half minutes an increase in torque ($\Delta\tau$) of 500 units was recorded. The crosslinking reaction was discontinued by the addition of Ionol to the copolymer. The crosslinked product had a melt index of 0.04 unpressed and a pressed sample thereof showed improved clarity.

In accordance with the instant invention, no matter which crosslinking promoter is employed, the polymeric material with the greater percent of branching will evidence the faster rate of crosslinking. This is shown in Table I where density, which varies inversely with branching, in a polymer or copolymer, varies inversely with the torque rate. The density in the ethylene-butylene copolymer is decreased by adding increasing amounts of butylene into the copolymer. The crosslinking promoter used in the examples in Table I was 0.02 g. manganese stearate.

*Table I*

| Example | Polymer | Density | Increase in torque (units/min.) |
|---|---|---|---|
| 6 | Butylene-ethylene | 0.949 | 220 |
| 7 | do | 0.950 | 200 |
| 8 | do | 0.957 | 100 |
| 9 | Ethylene (conventional) | 0.92 | 140 |
| 10 | Ethylene (high density) | 0.96 | 80 |

The following table exhibits some of the various compounds and complexes in which cobalt and manganese can be used as crosslinking promoters to perform the instant invention.

*Table II*

| Example No. | Run No. | Crosslinking promoter | Rate increase in torque (units/min.) | Melt index After X-linking | Clarity |
|---|---|---|---|---|---|
| 11 | 82-89 | (.02 g.) cobalt stearate<br>$Co[OCO(CH_2)_{16}CH_3]_2$ | 22 | 0.03 unpressed | Good. |
| 12 | 82-77 | (.02 g.) cobalt linoleate<br>$Co[OCO(CH_2)_7CH=CH(CH_2)_4CH_3]_2$ | 21.8 | 0.06 unpressed | Do. |
| 13 | 82-78 | (.02 g.) cobalt uversol<br>$Co\left[OC(O)-C_6H_{11}\right]_2$ | 55.5 | do | Very good. |
| 14 | 82-79 | (0.2 g.) cobalt resinate<br>$Co[OCC_{19}H_{29}]$ | 14.0 | 0.05 unpressed | Good. |
| 15 | 82-82 | (.02 g.) cobalt soyate | 52.6 | 0.06 unpressed | Very good. |
| 16 | 82-132 | (.044 g.) cobalt valerate<br>$Co[OC(CH_2)_3CH_3]_2$ | 4.5 | | Good. |

Table II—Continued

| Example No. | Run No. | Crosslinking promoter | Rate increase in torque (units/min.) | Melt index After X-linking | Clarity |
|---|---|---|---|---|---|
| 17 | 82-133 | (.053 g.) cobalt octoate $Co[O\overset{O}{\overset{\|}{C}}(CH_2)_6CH_3]_2$ | 9.4 | | Good. |
| 18 | 82-134 | (.042 g.) cobalt butyrate $Co[O\overset{O}{\overset{\|}{C}}(CH_2)_2CH_3]_2$ | 6.0 | | Do. |
| 19 | 82-135 | (.051 g.) cobalt benzoate $Co\left[O\overset{O}{\overset{\|}{C}}-\bigcirc\right]_2$ | 80.0 | | Very good. |
| 20 | 82-136 | (.05 g.) cobalt hexoate $Co[O\overset{O}{\overset{\|}{C}}(CH_2)_4CH_3]_2$ | 8.4 | | Good. |
| 21 | 82-146 | (.06 g.) cobaltic acetylacetonate $Co(C_5H_7O_2)_3$ | 83.0 | | Very good. |
| 22 | 75-40 | (.048 g.) manganic acetylacetonate $Mn(C_5H_7O_2)_3$ | 100.0 | 0.07 unpressed | Do. |
| 23 | 82-81 | (.02 g.) manganese uversol | 71.5 | 0.06 unpressed | Do. |

In all examples in Table II, 40 g. commercial polyethylene having a melt index of 0.7 and a density of 0.96 were charged to a Brabender Plastograph maintained at a temperature of 175° C.

An additional feature of the instant invention is that the degree of crosslinking can be controlled merely by the addition of an antioxidant. The antioxidant not only stops the crosslinking reaction, but also stabilizes the polymer to subsequent oxidative degradation.

This is shown quite clearly in Table III hereinafter wherein oxygen uptake is compared between crosslinked polyethylene samples one of which has been stabilized in an antioxidant (Ionol; 2,6-ditertiary-butyl-4-methyl-phenol).

Table III

STABILIZATION EFFECT OF ANTIOXIDANT AFTER CROSSLINKING

| Time (min.) | A [1] Oxygen [3] uptake (ml.) | B [2] Oxygen [3] uptake (ml.) |
|---|---|---|
| 5 | 0 | 1.8 |
| 10 | 0 | 3.2 |
| 15 | 0 | 4.0 |
| 20 | 0 | 5.6 |
| 45 | 0 | 11.8 |
| 100 | 0 | 22.9 |
| 200 | 0 | 35.3 |

[1] A=sample from 40 g. polyethylene crosslinked in Brabender using 0.05% cobalt stearate at 175° C. followed by immersion in 10% Ionol solution at room temperature.
[2] B=same as A except no immersion in Ionol solution.
[3] Oxygen uptake measured on a gas buret.

The method of stopping the crosslinking reaction with an antioxidant can be accomplished in various ways. Thus the crosslinked polymeric material can be immersed in an antioxidant bath (as in Table III) or the antioxidant can preferably be added directly to the reactants during the crosslinking operation in the mixing unit (as in the examples).

The amount of antioxidant necessary to discontinue the crosslinking operation and stabilize the polymeric material against subsequent oxidative degradation is in the range 0.05–0.20% by weight of the total reactants charged.

We claim:

1. The process of crosslinking a member of the group consisting of polyethylene and a copolymer of ethylene and butylene which comprises subjecting said member at a temperature above its respective melting point in the presence of free oxygen to the action of a crosslinking promoter consisting essentially of an organo-metallic compound containing a transition metal in a valence state less than 4 selected from the group consisting of Co and Mn, said compound being soluble in said polymeric group member.

2. The process according to claim 1 wherein the amount of the transition metal is 0.002–0.026% of the weight of the total reactants charged.

3. The process according to claim 1 wherein the compound is a metal complex.

4. The process according to claim 3 wherein the complex is an acetylacetonate.

5. The process according to claim 1 wherein the compound is a salt of an organic acid, said acid having at least four carbon atoms.

6. The process according to claim 5 wherein the organic acid is a member of the group consisting of stearates, butyrates, octoates, naphthenates and tallates.

7. The process of crosslinking a copolymer of ethylene and butylene which comprises admixing said copolymer at a temperature above its melting point in the presence of free oxygen with a crosslinking promoter consisting essentially of manganese stearate in an amount equal to about 0.05% by weight of the copolymer.

8. The process of crosslinking solid polyethylene which comprises admixing said polyethylene in the presence of free oxygen at a temperature above its melting point with a cross-linking promoter consisting essentially of manganese stearate in an amount equal to about 0.05% by weight of the polyethylene.

9. The process according to claim 8 wherein the cross-linking promoter is cobalt stearate.

10. The process according to claim 8 wherein the cross-linking promoter is cobaltic acetylacetonate.

11. The process according to claim 8 wherein the cross-linking promoter is manganic acetylacetonate.

References Cited in the file of this patent

UNITED STATES PATENTS

| | | |
|---|---|---|
| 2,654,717 | Rehberg et al. | Oct. 6, 1953 |
| 2,826,570 | Ivett | Mar. 11, 1958 |